(12) United States Patent
Anzai

(10) Patent No.: US 7,226,092 B2
(45) Date of Patent: Jun. 5, 2007

(54) FASTENING DEVICE WITH LOCK MECHANISM

(75) Inventor: Tadashi Anzai, Tokyo (JP)

(73) Assignee: Sugatsune Kogyo Co., Ltd., Tokyo (JP)

( * ) Notice: Subject to any disclaimer, the term of this patent is extended or adjusted under 35 U.S.C. 154(b) by 42 days.

(21) Appl. No.: 10/537,170

(22) PCT Filed: Dec. 2, 2003

(86) PCT No.: PCT/JP03/15381

§ 371 (c)(1),
(2), (4) Date: Jun. 1, 2005

(87) PCT Pub. No.: WO2004/051037

PCT Pub. Date: Jun. 17, 2004

(65) Prior Publication Data

US 2006/0071481 A1    Apr. 6, 2006

(30) Foreign Application Priority Data

Dec. 3, 2002    (JP) .............................. 2002-351488

(51) Int. Cl.
*E05C 5/00* (2006.01)
(52) U.S. Cl. .................. 292/247; 292/256.69
(58) Field of Classification Search ................ 292/113, 292/247, 256.69
See application file for complete search history.

(56) References Cited

U.S. PATENT DOCUMENTS

| 2,994,934 A * | 8/1961 | Kraus ........................... 24/271 |
| 3,602,723 A * | 8/1971 | Swanson ..................... 292/113 |
| 6,840,551 B2 * | 1/2005 | Evans ......................... 292/113 |

FOREIGN PATENT DOCUMENTS

| JP | S59-42266 | 3/1984 |
| JP | S61-20873 | 2/1986 |
| JP | H6-18583 U | 3/1994 |

* cited by examiner

*Primary Examiner*—Gary Estremsky
(74) *Attorney, Agent, or Firm*—Osha Liang LLP

(57) ABSTRACT

A fastening device B comprises a support member secured to one body to be fastened, a base member secured to the other body to be fastened, an operating lever having a U-shaped configuration in section and a basal end of which is turnably connected to the base member through a first shaft, an arm one end part of which is turnably connected to the support member through a second shaft and the other end part of which is turnably connected to the basal end part of the operating lever through a third shaft, and a lock mechanism for locking the operating lever at an overlap position with respect to the base member. The lock mechanism includes a lock claw disposed at the base member, a lock pin laid between opposite side walls of the operating lever, and a pin biasing member received in the operating lever for biasing the lock pin toward the lock claw.

11 Claims, 12 Drawing Sheets

FASTENING DEVICE WITH LOCK MECHANISM

TECHNICAL FIELD

This invention relates to a fastening device with a lock mechanism capable of fastening two bodies to be fastened and keeping them in the fastened position.

BACKGROUND ART

A fastening device disclosed in Japanese Utility Model Application Laid-Open No. S61-20873 comprises a support metal piece secured to one body to be fastened, a base metal piece secured to the other body to be fastened, and an operating lever having a U-shaped configuration in section. A basal end part of the operating lever is turnably connected to the base metal piece through a first shaft. The fastening device further comprises an arm, one end part of which is removably and turnably connected to the support metal piece through a second shaft and the other end part of which is turnably connected to the basal end part of the operating lever through a third shaft. The arm is comprised of an assembly which includes two elongate arm elements each provided at one end thereof with a engaging part, and a compression coiled spring. The second and third shafts are biased toward each other by the compression coiled spring.

In the above fastening device, a dead point where the third shaft is aligned with the first and second shafts is located at an intermediate of the turning range of the operating lever. The operating lever is turned beyond the position where the third shaft is located at the dead point and overlapped with the base metal piece. In that condition, the two bodies are fastened. The overlap position where the operating lever is overlapped with the base metal piece is kept by a lock mechanism.

The lock mechanism will now be described. A cutout is formed at one side wall of the operating lever, and one part of the peripheral edge of this cutout is provided as a lock claw. Two support elements are cut and raised on the base metal piece, and a lock pin is laid between the two support elements. One end part of the lock pin is inserted in a support hole of one support element with play such that the lock pin is turnably supported by the support element. The other end part of the lock pin is passed through a long hole of the other support element and provided as a handle part.

A hook pin is secured to the base metal piece at the area on the opposite side of the third shaft when viewed from the lock pin. A tension coiled spring (pin biasing member) is hooked over between this lock pin and the hook pin. In the state that the operating lever is overlapped with the base metal piece as mentioned above, the lock pin is biased by the tension coiled spring and is kept engaged with the lock claw of the operating lever. When the handle part of the lock pin is moved along the long hole of the support element against the tension coiled spring, the lock pin is disengaged from the lock claw and brought to the engagement released position. With the lock pin kept in the engagement released position, the operating lever is turned in such a manner as to be moved away from the base metal piece and the operating lever is further turned until the third shaft is moved beyond the dead point. By doing so, the two bodies are released from the fastened condition.

However, in the device disclosed in the above-mentioned Laid-Open Publication, when the operating lever is located away from the base metal piece, the tension coiled spring installed on the base metal piece is exposed. Therefore, there is such a risk that the tension coiled spring is accidentally contacted with the operator's hand and broken or disengaged from the lock pin. Moreover, since it is necessary to keep the lock pin in the engagement released position with one hand and to turn the operating lever with the other hand simultaneously at the time of unfastening operation, operability is bad.

DISCLOSURE OF THE INVENTION

The present invention has been accomplished in order to solve the above-mentioned problems. According to the present invention, there is provided a fastening device comprising (a) a support member secured to one body to be fastened; (b) a base member secured to the other body to be fastened; (c) an operating lever having a U-shaped configuration in section and a basal end part of which is turnably connected to the base member through a first shaft; (d) an arm one end part of which is turnably connected to the support member through a second shaft and the other end part of which is turnably connected to the basal end part of the operating lever through a third shaft; and (e) a lock mechanism; the operating lever being turned beyond a dead point where the third shaft is aligned with the first and second shafts in accordance with turning motion of the operating lever until the operating lever reaches an overlap position where the operating lever is overlapped with the base member, the operating lever being locked at the overlap position by the lock mechanism, wherein the lock mechanism includes a lock claw disposed at the base member, a lock pin laid between opposite side walls of the operating lever and movable between an engagement position with respect to the lock claw and an engagement released position where the lock pin is disengaged from the lock claw, and a pin biasing member received in the operating lever for biasing the lock pin toward the lock claw so that the lock pin is kept engaged with the lock claw.

According to the above-mentioned construction, since the pin biasing member is received in the operating lever, it can be prevented that the pin biasing member is accidentally contacted with the operator's hand and broken or disengaged. Moreover, since the lock pin is disposed at the operating lever, the operating lever can be turned while disengaging the lock pin with only a single hand. Thus, operability is good.

As one embodiment, the arm includes a shaft biasing member for biasing the second and third shafts toward each other, and the operating lever is turn-biased by the shaft biasing member such that the operating lever is moved away from the dead point. According to this construction, since the operating lever can be turned by the shaft biasing member of the arm, operability is good.

As another embodiment, a shaft biasing member is disposed between the first shaft and the second shaft and adapted to bias the first and second shafts away from each other, and the operating lever is turn-biased by the shaft biasing member such that the operating lever is moved away from the dead point. According to this construction, since the operating lever can be turned by the shaft biasing member, operability is good.

Preferably, one end part of the lock pin is passed through a support hole of one side wall of the operating lever with play, thereby the lock pin is turnably supported by the support hole, the other end part of the lock pin is passed through a long hole formed in the other side wall of the operating lever and projected outside the operating lever so as to serve as a handle part, the lock claw is arranged proximate to the other side wall of the operating lever within the operating lever, and the handle part of the lock pin is movable between an engagement position with respect to the lock claw and an engagement released position away from the lock claw, along the long hole. According to this construction, the construction for attaching the lock pin to the operating lever can be simplified.

Preferably, the lock claw is projected to the opposite side of the third shaft, the pin biasing member is composed of a tension coiled spring, one end of the tension coiled spring is hooked on the lock pin and the other end is hooked on a hooking part which is disposed at the operating lever, the hooking part is located on a basal end side of the operating lever from the lock pin, and the lock pin is biased toward the third shaft by the tension coiled spring. According to this construction, since the tension coiled spring acting as the pin biasing member is disposed between the lock pin and the third shaft, the operating lever and the base member can be made small in size.

Preferably, the third shaft is provided as the hooking part. According to this construction, since the third shaft also serves as the hooking part of the tension coiled spring, the construction of the operating lever can be simplified and the operating lever can be made small in size.

BEST MODE FOR CARRYING OUT THE INVENTION

Figure 1:
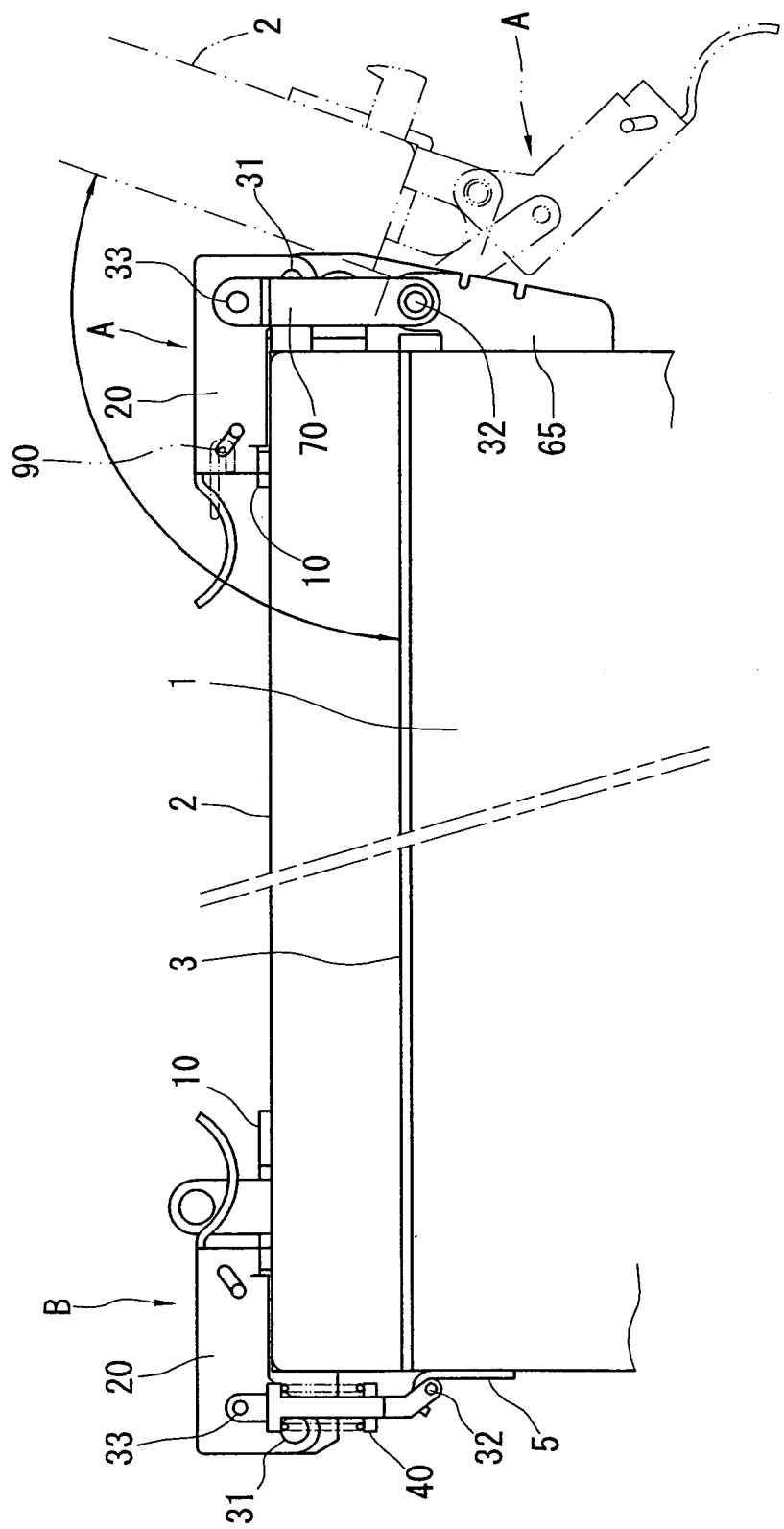
FIG. 1 is a schematic side view showing the upper part of a casing with a cover equipped with two fastening devices according to the present invention.
Figure 2:
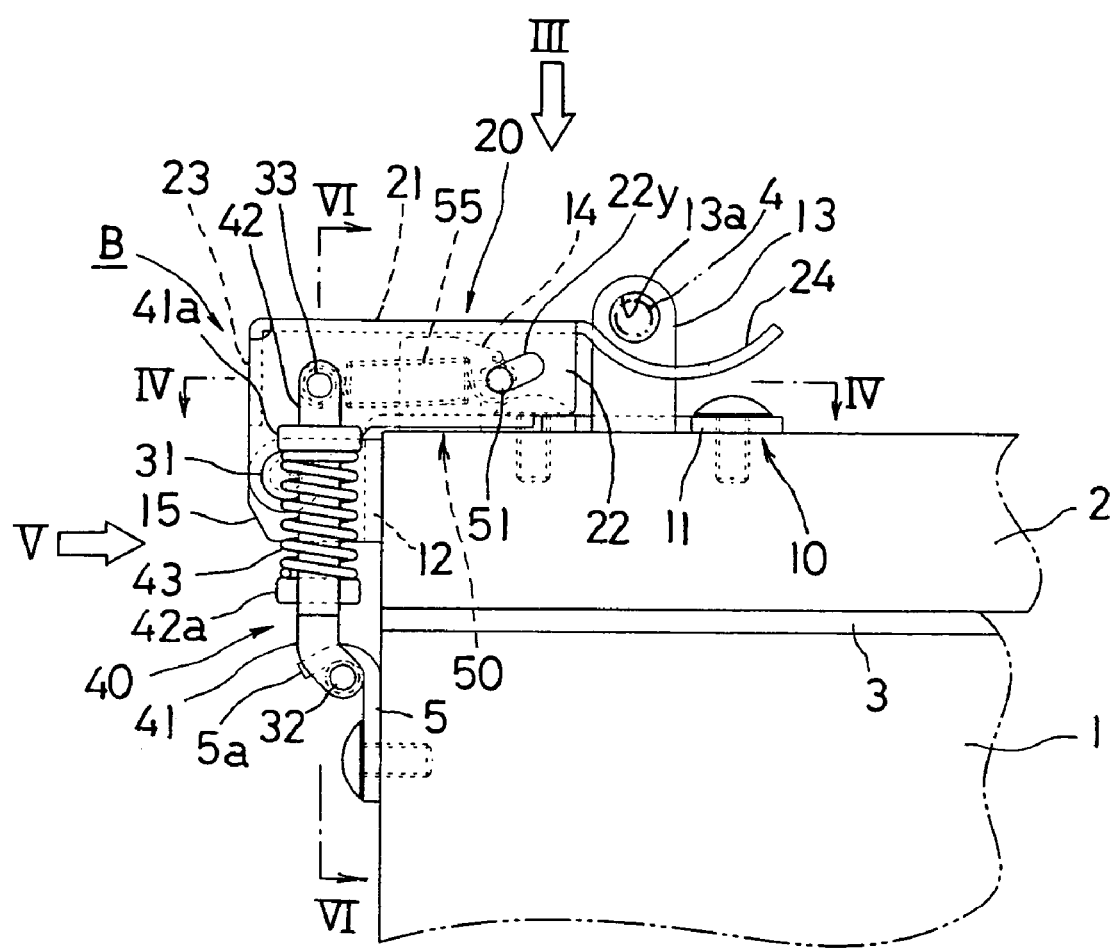
FIG. 2 is an enlarged side view of one of the fastening devices.
Figure 3:
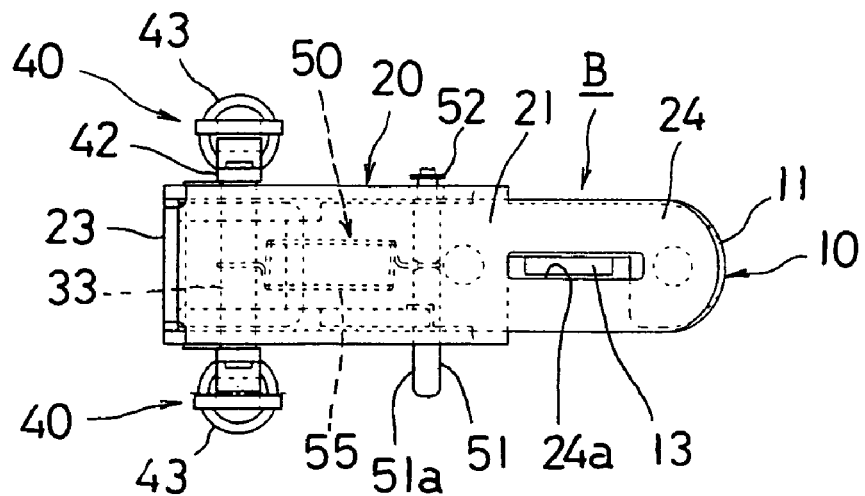
FIG. 3 is an enlarged plan view of the fastening device, when viewed in a direction as indicated by an arrow III of FIG. 2.

Embodiments of the present invention will be described hereinafter with reference to FIGS. 1 through 15. As shown in FIG. 1, the right side edge of a casing 1 (one body to be fastened) is connected to the right side edge of a cover 2 (the other body to be fastened) through a fastening device A with a hinge function such that the cover 2 can be turned relative to the casing 1. The top opening of the casing 1 can be opened and closed by this cover 2. The left side edge of the cover 2 is hooked on the left side edge of the casing 1 through a fastening device B, thereby the cover 2 is kept in a closed position. The casing 1 is provided at the peripheral edge of the top opening with a seal member 3 by which the casing 1 and the cover 2 are held in an air tight or liquid tight condition. The seal member 3 may be applied to the cover 2.

The detailed construction of the fastening device B will be described first, chiefly with reference to FIGS. 2 through 6. The fastening device B comprises a hook-shaped support metal piece 5 (support member) secured to one side surface of the casing 1, a base metal piece 10 (base member) secured to the left side edge part of the cover 5, an operating lever 20 a basal end part of which is turnably connected to the base metal piece 10 through a first shaft 31, a pair of arms 40 for linking the support metal piece 5 and the basal end part of the operating lever 20, and a lock mechanism 50 for keeping the fastening state of the cover 2 caused by the operating lever 20. The support metal piece 5 has a hook part 5a at its upper end part.

The base metal piece 10 includes an elongate flat plate part 11 secured to the upper surface of the cover 2 and extending in a direction orthogonal to its left side edge, a short flat plate part 12 disposed orthogonal to the flat plate part 11 and along the edge surface of the cover 2, a regular lock element 13 and a temporary lock element 14 which are raised in such a manner as to be orthogonal to the flat plate part 11, and a pair of support elements 15 which are raised in such a manner as to be orthogonal to the flat plate 12. The regular lock element 13 is formed at the widthwise center of the flat plate part 11. A hole 13a for allowing a shackle (only shown in FIG. 2) of a padlock to pass therethrough is formed in an upper end part of the regular lock element 13.

Figure 7:
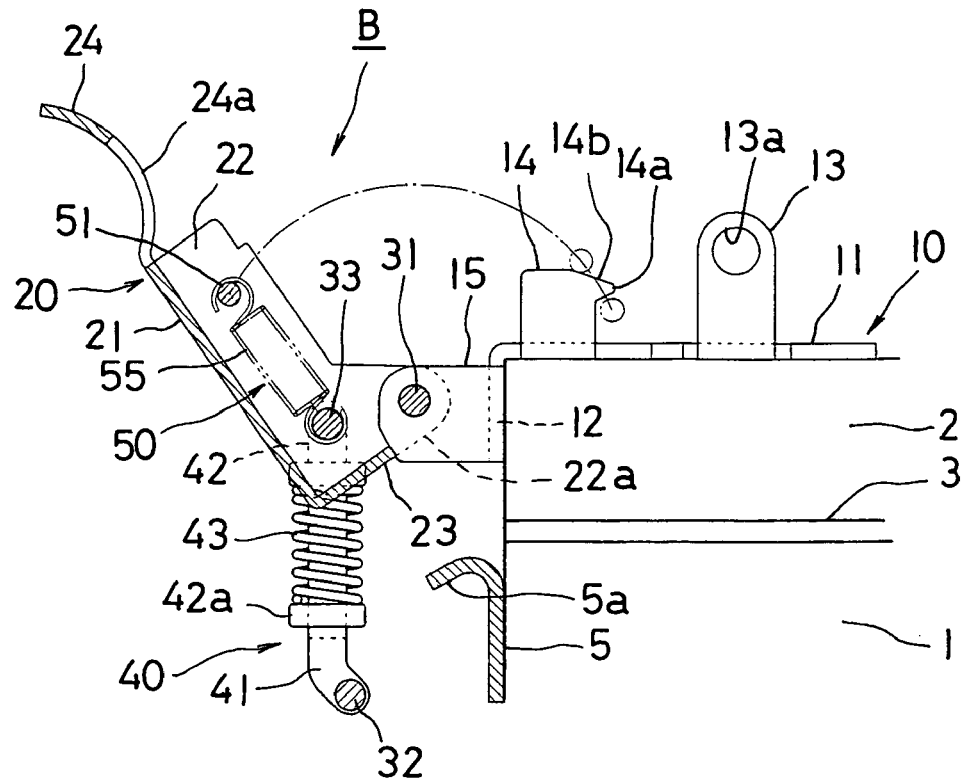
FIG. 7 is a side sectional view showing the fastening device before fastening.
Figure 8:
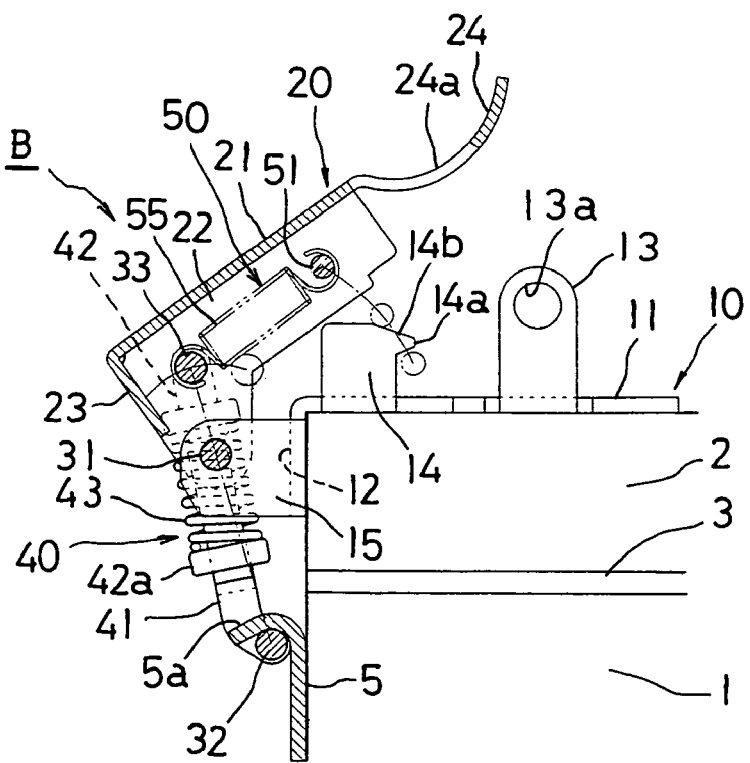
FIG. 8 is a side sectional view showing a state of a dead point during the fastening operation of the fastening device.
Figure 9:
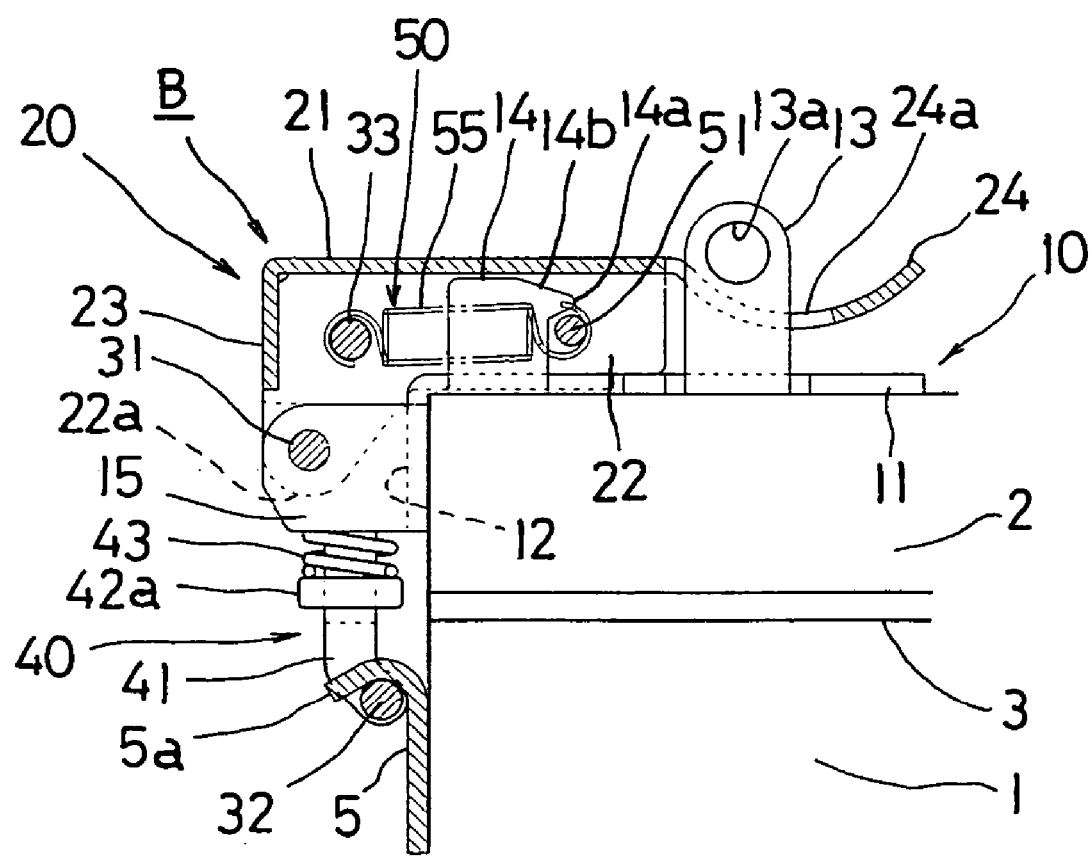
FIG. 9 is a side sectional view showing a fastening state of the fastening device.
Figure 10:
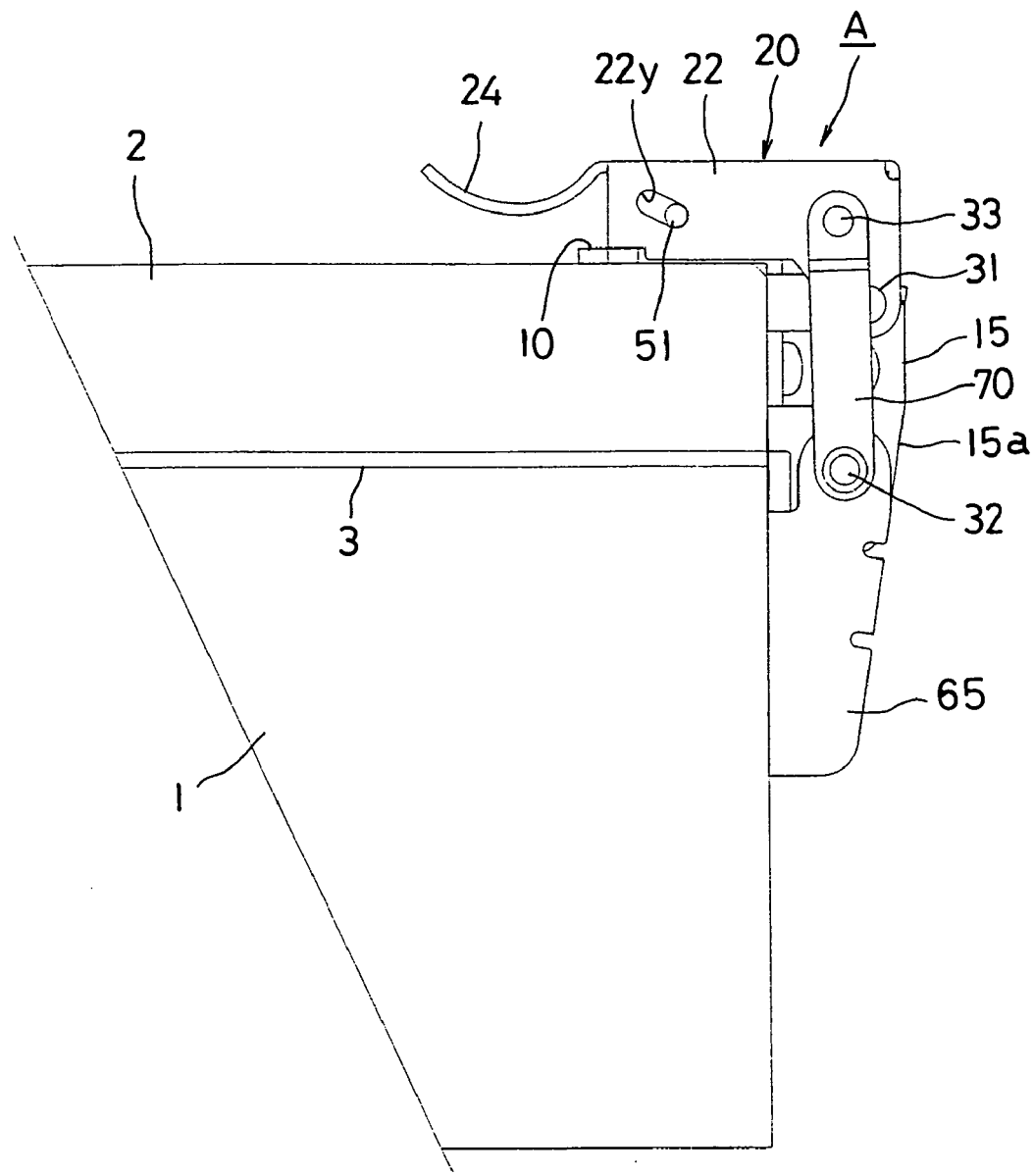
FIG. 10 is an enlarged side view of the other fastening device having a hinge function.
Figure 11:
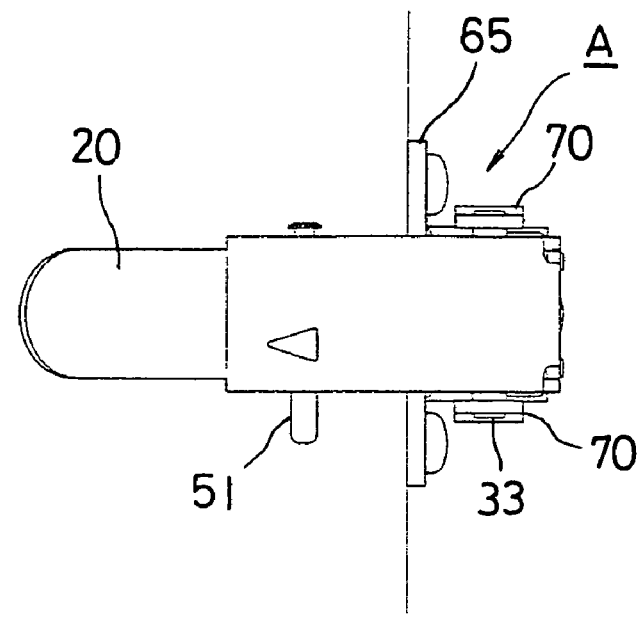
FIG. 11 is a plan view of the other fastening device.
Figure 12:
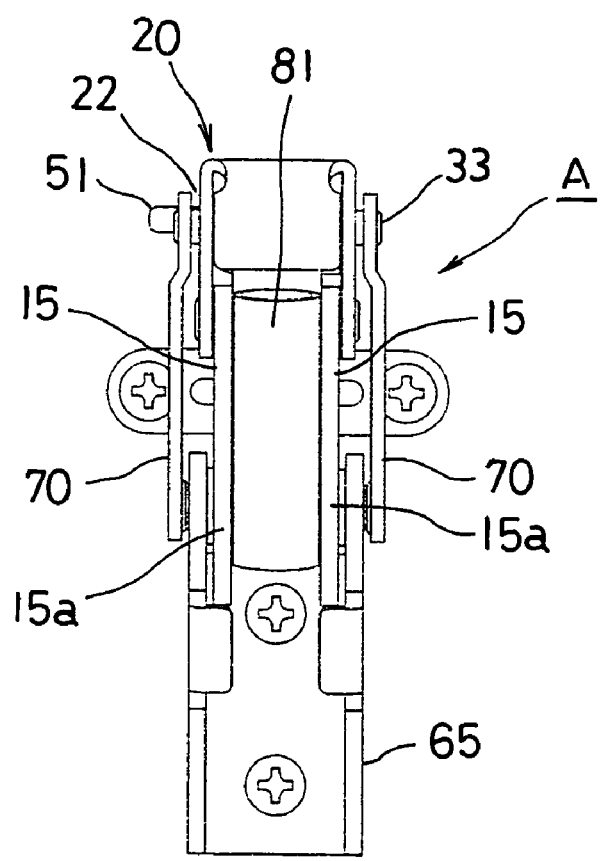
FIG. 12 is a front view of the other fastening device.

The temporary lock element 14 is one of the component elements of the lock mechanism 50. The temporary lock element 14 is formed in the vicinity of one side edge of the flat plate part 11 and disposed between the regular lock element 13 and a third shaft 33 as later described. As best shown in FIGS. 7 through 9, a lock claw 14a projecting toward the opposite side of the third shaft 33 is formed at the upper end part of the temporary lock element 14. The upper surface of this lock claw 14a is formed as an inclination surface 14b. The first shaft 31 is laid between the pair of support elements 15.

The operating lever 20 is formed in a U-shaped configuration in section and in an elongate shape. The operating lever 20 includes a main wall 21, a pair of side walls 22 extending from the opposite side edges of the main wall 21 at right angles, and an end wall 23 which blocks an opening formed at the basal end parts of the pair of side walls 22. The basal end parts of the pair of side walls 22 are projected in a direction orthogonal to the main wall 21. Projecting end parts 22a of the pair of side walls 22 are turnably supported by the base metal piece 10 through the first shaft 31. A handle part 24 is extended from the tip part of the main wall 21. A slit 24a for allowing the main lock element 13 to pass therethrough is formed in the handle part 24.

Figure 4:
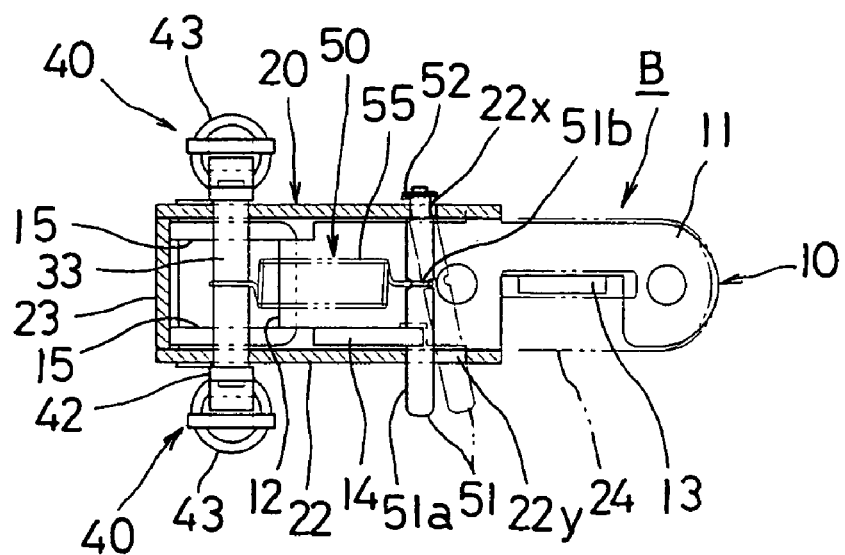
FIG. 4 is a plan sectional view of the fastening device taken along line IV—IV of FIG. 2.

A third tunable 33 is hung over between the basal end sides of the pair of side walls 22 of the operating lever 20, and a rod-like lock pin 51 is hung over between the distal end parts of the pair of side walls 22. As best shown in FIG. 4, one end part of the lock pin 51 is smaller in diameter than the remaining part of the lock pin 51. The lock pin 51 is passed through a round support hole 22x with play which support hole 22x is formed in one of the pair of side walls 22 and projected outside the operating lever 20. An annular step is formed at this end part of the lock pin 51 on the inner side of the operating lever 20, and a lock ring 52 is fitted to the end part of the lock pin 51 at the outside of the operating lever 20. The end part of the lock pin 51 is turnably connected to the afore-mentioned side wall 22 of the operating lever 20.

The other end part of the lock pin 51 is passed through an inclination long hole 22y formed in the other side wall 22 (which is near the temporary lock element 14) and projected outside the operating lever 20. The lock pin 51 is movable along this long hole 22y. The other end part of the lock pin 51 is provided as a handle part 51a. A line connecting the left lower end part (which corresponds to the engaging position of the lock pin 51 as later described) of the long hole 22y and the support hole 22x is orthogonal to the longitudinal direction of the operating lever 20.

A tension coiled spring 55 (pin biasing member) is hung over between the third shaft 33 and the lock pin 51. The third shaft 33 is provided as a hooking part of the tension coiled spring 55. The tension coiled spring 55 and the lock pin 51 constitute the main component elements of the lock mechanism 50. As shown in FIG. 4, an annular groove 51b is formed in the center of the lock pin 51. By hooking the tension coiled spring 55 on this groove 51b, the lock pin 51 is prevented from displacing laterally.

Figure 5:
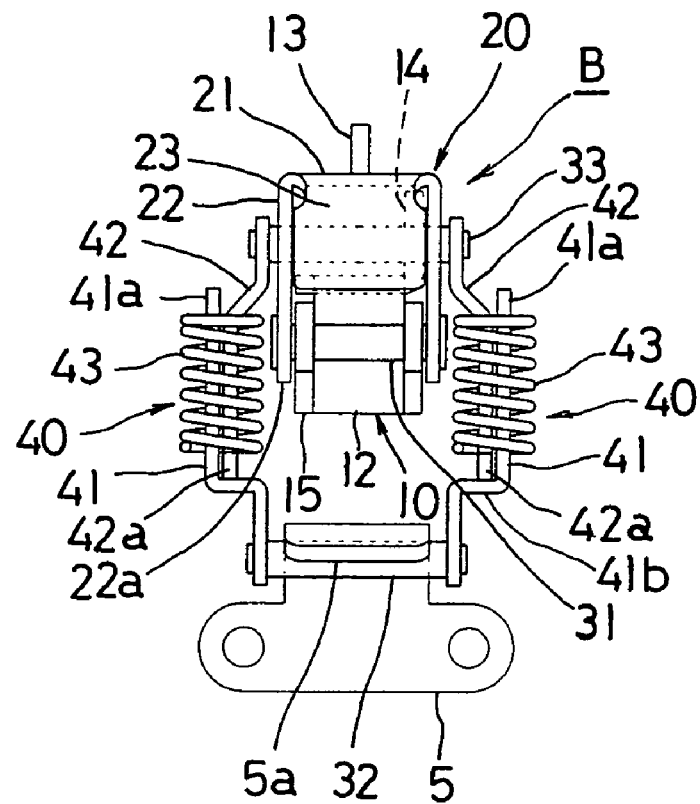
FIG. 5 is a front view of the fastening device when viewed in a direction as indicated by an arrow V of FIG. 2.
Figure 6:
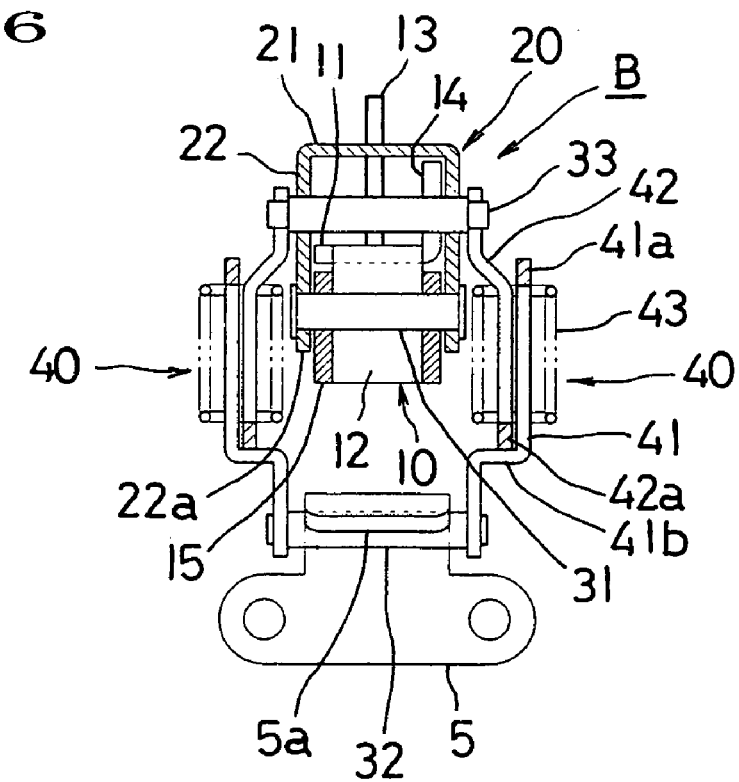
FIG. 6 is a sectional view of the fastening device taken on line VI—VI of FIG. 2.

The arm 40 (arm means) will be described next in great detail. As best shown in FIGS. 5 and 6, each arm 40 comprises an assembly which includes a first arm element 41 and a second arm element 42 which are made of an elongate metal plate, and a compression coiled spring 43 (shaft biasing member) which envelops those arm elements 41, 42. The upper end part of the first arm element 41 includes an engaging part 41a which has a T-shaped configuration and projects laterally, and the lower end part of the second arm element 42 includes an engaging part 42a which has a T-shaped configuration and projects laterally. The compression coiled spring 43 is hung over between the engaging parts 41a, 42a in order to bias the engaging parts 41a, 42a away from each other. The first arm element 41 has an engaging shoulder part 41b. The engaging part 42a of the second arm element 42 is abutted with this engaging shoulder part 41b, thereby the interval between the engaging parts 41a, 42a is restricted from being increased and the compression coiled spring 43 is kept in its compressed position.

A second shaft 32 is laid between the lower end parts of the first arm elements 41 of the pair of arms 40. This second shaft 32 can be hooked on the hooking part 5a of the support metal piece 5. By this, the lower end parts of the arms 40 are removably and turnably connected to the support metal piece 5 through the second shaft 32. The upper end parts of the second arm elements 42 of the pair of arms 40 are connected respectively to the opposite end parts of a third shaft 33 which is projected outside from the operating lever 20. By this, the arms 40 are turnably connected to the basal end part of the operating lever 20 through the third shaft 33.

Operation of the fastening device B will now be described with reference to FIGS. 7 through 9. With the cover 2 in its closed position, as shown in FIG. 7, the operating lever 20 is open with respect to the base metal piece 10 and the arm 40 is located away from the support metal piece 5. First, the second shaft 32 is hooked on the hook 5a of the support metal piece 5, while turning the operating lever 20 clockwise about the first shaft 31. By this, the arm 40 is turnably connected to the support metal piece 5 about the second shaft 32.

When the operating lever 20 is further turned clockwise, the interval between the second shaft 32 and the third shaft 33 is increased. As the interval between the second shaft 32 and the third shaft 33 is increased, the interval between the engaging parts 41a, 42a of the arm elements 41, 42 is reduced, thereby the compression coiled spring 43 is compressed. Since mutually attracting force acts on the second shaft 32 and the third shaft 33 under the resilient force of the compression coiled spring 32, the operating lever 20 is subjected to counterclockwise moment, and at the same time, the cover 2 is urged against the casing 1.

When the operating lever 20 is further turned clockwise against the compression coiled spring 43, the third shaft 33 is brought to the dead point as shown in FIG. 8. That is, three shafts 31, 32, 33 are linearly aligned and the first shaft 31 is situated between the second shaft 32 and the third shaft 33. In that condition, the interval between the second shaft 32 and the third shaft 33 is maximum and the compression coiled spring 43 is in its maximum compression state.

When the operating lever 20 is turned clockwise beyond the dead point, the force for attracting the third shaft 33 toward the second shaft 32 caused by the compression coiled spring 43 acts as a moment for turning the operating lever 20 clockwise and the operating arm 20 is turned toward the base 10. When the operating lever 20 is brought near the base 10, the nearby part of the handle part 51a of the lock pin 51 reaches the inclination surface 14b of the lock claw 14a. Since the compression coiled spring 43 is much stronger than the tension coiled spring 55, the operating lever 20 reaches the overlap position where the operating lever 20 is overlapped with the base 10 as shown in FIG. 9. During this process, the nearby part of the handle part 51a of the lock pin 51 is moved along the inclination surface 14b, further moved beyond the tip of the lock claw 14a and then returned by the tension coiled spring 55 so as to enter under the lock claw 14a. Since the long hole 22y formed in the side wall 22 of the operating lever 20 is inclined in a direction intersecting the inclination surface 14b of the lock claw 14a, the lock pin 51 can make such a movement as just mentioned above. The operating lever 20 may, of course, be turned manually to the overlap position with respect to the base metal piece 10.

With the operating lever 20 which has been overlapped with the base 20 in the manner as mentioned above, the cover 2 is tightened to the casing 1 by the resilient force of the compression coiled spring 43 of the arm 40. Since the lock pin 51 is temporarily locked to the lock claw 14a which is disposed at the base metal piece 10, the operating lever 20 is not turned counterclockwise even if external force is acted on the cover 2 in the opening direction and thus, the cover 2 can be kept in its tightened position with respect to the casing 1.

In the overlap position where the operating lever 20 is overlapped with the base metal piece 10, the slit 24a of the handle part 24 of the operating lever 20 is fitted to the regular lock element 13 of the base metal piece 10. Thus, the regular locking can be performed by passing the shackle 4 of the padlock through the hole 13a of the regular lock element 13.

In order to release the tightening state of the cover 2, the regular lock is released first and then, the handle part 24 of the lock pin 51 is moved in a direction away from the third shaft 33 along the long hole 22y against the tension coiled spring 55. By doing so, the lock pin 51 is disengaged from the lock claw 14a and thus, the temporarily locked state is released. While keeping the lock pin 51 in the temporary engagement released position in the manner as just mentioned above, the operating lever 20 is turned counterclockwise against the compression coiled spring 43 so as to move away from the base metal piece 10. Since the engagement releasing operation of the lock pin 51 and the turning operation of the operating lever 20 can be made simultaneously by a single hand, operability is good.

When the operating lever 20 is further turned counterclockwise against the compression coiled spring 43, the operating lever 20 reaches the dead point shown in FIG. 8 before long. When the operating lever 20 is further turned in the same direction, the operating lever 20 is subjected to counterclockwise moment by the compression coiled spring 43 and brought into the state shown in FIG. 7 before long, and the second shaft 32 is also brought away from the support metal piece 5. The cover 2, which has been released from the tightened state in the manner as just mentioned above, can readily be opened.

With the operating lever 20 kept away from the base metal piece 10, the tension coiled spring 55 is received in the operating lever 20 having a U-shaped configuration in section and therefore, the tension coiled spring 55 is never broken nor disengaged by being accidentally contacted with the operator's hand.

The tightening device A located on the side where the center of rotation of the cover 2 exists will now be described with reference to FIGS. 10 to 15. This tightening device A comprises three shafts 31 through 33, an operating lever 20 and a lock mechanism 50, which are all similar to those of the tightening device B. Although the base metal piece secured to a cover 2 is different in configuration from that of the tightening device B, it is also denoted by the same reference numeral "10" in FIGS. 10 through 15.

In the fastening device A, a support metal piece 65 (support member) having a U-shaped configuration in section is secured to the casing 1. A second shaft 32 is passed through the opposite side walls of the upper end part of the support metal piece 65. The lower end parts of a pair of arms 70 formed by partly bending an elongate metal plate are connected to the opposite end parts of the second shaft 32 at the outside of the support metal piece 65 and thus, non-removably turnably connected to the support metal piece 65 through the second shaft 32. The upper end parts of the arms 70 are turnably connected to the basal end part of the operating lever 20 through the third shaft 33.

Figure 15:
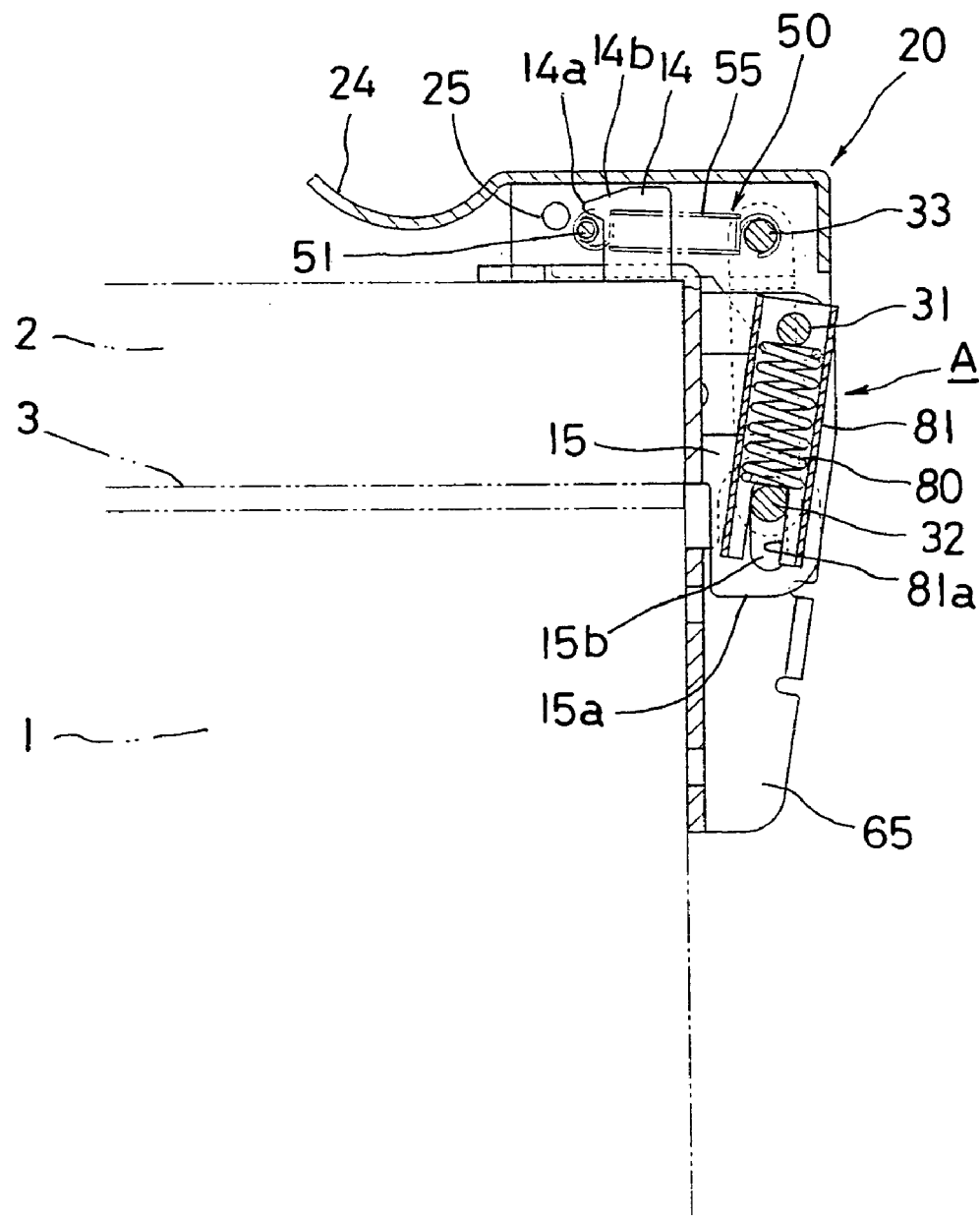
FIG. 15 is a side sectional view showing a fastening state of the other fastening device.

A pair of support elements 15 of the base metal piece 10 includes a pair of extension parts extending toward the casing 1. The pair of extension parts 15a are disposed at the inner of the opposite side walls of the support metal piece 65. As best shown in FIG. 15, a long hole 15b extending generally vertically when the cover 2 is in its closed position is formed in each extension part 15a. The second shaft 32 is passed through this long hole 15b.

A compression coiled spring 80 (shaft biasing member) is interposed between the first shaft 31 and the second shaft 32 and adapted to bias the first and second shafts 31, 32 in such a manner as to be moved away from each other. The compression coiled spring 80 is received in a circular cylindrical protection sleeve 81. The first shaft 31 is passed through one end part (upper end part when the cover 2 is in its closed position) of the protection sleeve 81. As best shown in FIG. 15, a slit 81a for allowing the second shaft 32 to pass therethrough is formed in the other end part of the protection sleeve 81. Owing to this arrangement, the protection sleeve 81 is supported between the first and second shafts 31, 32 while allowing the shafts 31, 32 to move relative to each other.

Figure 13:
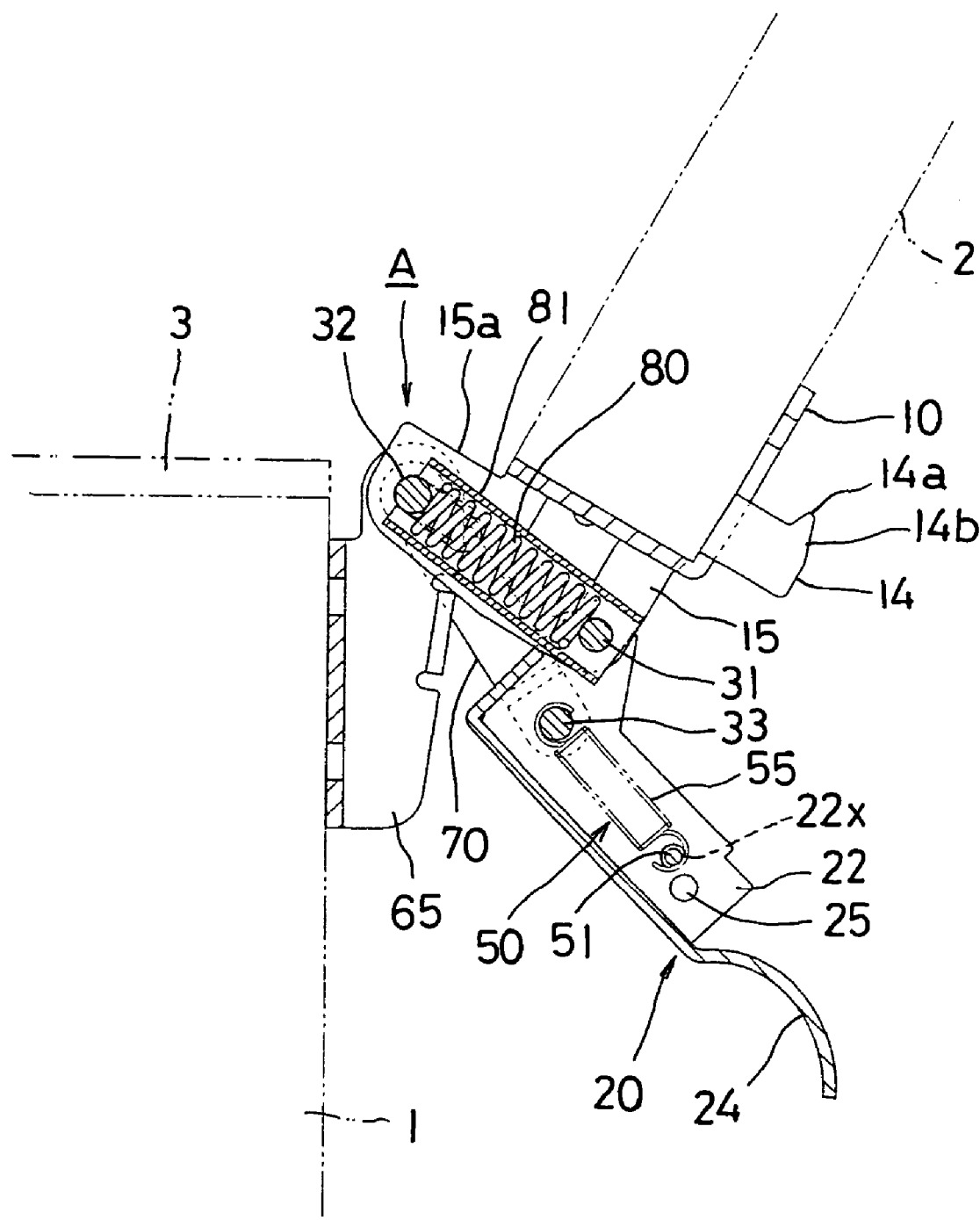
FIG. 13 is a side sectional view showing the other fastening device with a cover opened.
Figure 14:
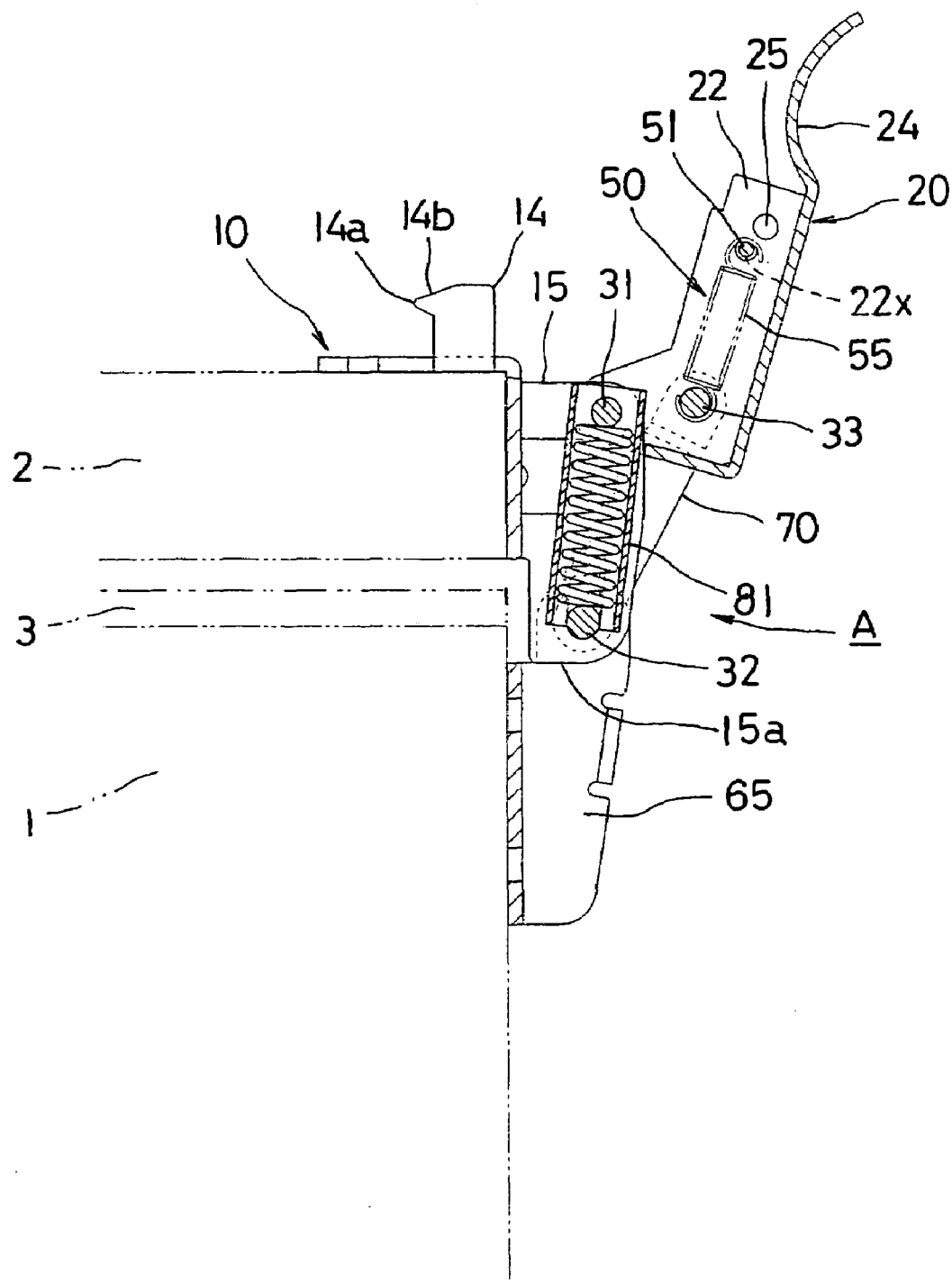
FIG. 14 is a side sectional view of the other fastening device before fastening and with the cover closed.

In the fastening device A, no regular lock element is formed in the base metal piece 10. Instead, as shown in FIGS. 13 through 15, a lock hole 25 is formed at an area in the vicinity of a support hole 22x of the side wall 22 on the opposite side of a temporary lock element 14 in the operating arm 20. A line connecting the lock hole 25 and the left upper end part (end part corresponding to the engagement released position of the lock pin 51) of a long hole 22y is orthogonal to the longitudinal direction of the operating lever 20. By passing a regular lock member 90 (only shown in FIG. 1) through the lock hole 25 and the left upper end part of the long hole 22y, the lock pin 51 is prohibited from moving to the engagement released position of the lock pin 51 thereby the regular locking is performed.

Operation of the fastening device A will now be described with reference to FIGS. 13 through 15. The cover 2 is turned about the second shaft 32 from the open position of FIG. 13 to the closed position of FIG. 14. In the closed position of FIG. 14, the cover 2 is lifted from the casing 1. The cover 2 is kept in this lifted position by the resilient force of the compression coiled spring 80. When the operating lever 20 is turned counterclockwise against the compression coiled spring 80, the operating lever 20 reaches the dead point where the three shafts 31, 32, 33 are aligned. During this process, the arm 70 is turned counterclockwise following the operating lever 20 and generally erected. However, since the length of the arm 70 is almost unchanged, the first shaft 31 is lowered. Then, following the first shaft 31, the cover 2 is lowered so as to be pressed with the seal member 3. Since the cover 2 is not contacted with the seal member 3 during its closing operation and the cover 2 is lowered in accordance with the turning operation of the operating lever 20, so as to be pressed with the seal member 3, the seal member 3 can be compressed in a favorable manner without being twisted. Thus, sealability can be enhanced.

The long hole 15b is formed in the extension part 15a of the support element 15 of the base metal piece 10, a slit 81a is formed in the protection sleeve 81 and the second shaft 32 is passed through the long hole 15b and the slit 81a. Owing to this arrangement, the cover 2 is allowed to be lowered.

When the operating lever 20 is turned beyond the dead point, the lever 20 is turn-biased toward the base metal piece 10 by the force of the compression coiled spring 80 and reaches the overlap position shown in FIG. 15. Since the locking/unlocking operation caused by the lock mechanism 50 which is to be performed thereafter is same as in the above-mentioned fastening device B, description thereof is omitted.

With the operating lever 20 overlapped with the base metal piece 10, the cover 2 is more slightly moved away from the casing 1 than at the time when the lever 20 is located at the dead point. However, the cover 2 is kept pressed with the seal member 3. When the operating lever 20 is returned to the position shown in FIG. 14 from the position shown in FIG. 15 beyond the dead point by turning the operating lever 20 clockwise after unlocked, the cover 2 is lifted from the seal member 3. Thereafter, the cover 2 is opened.

Figure 16:
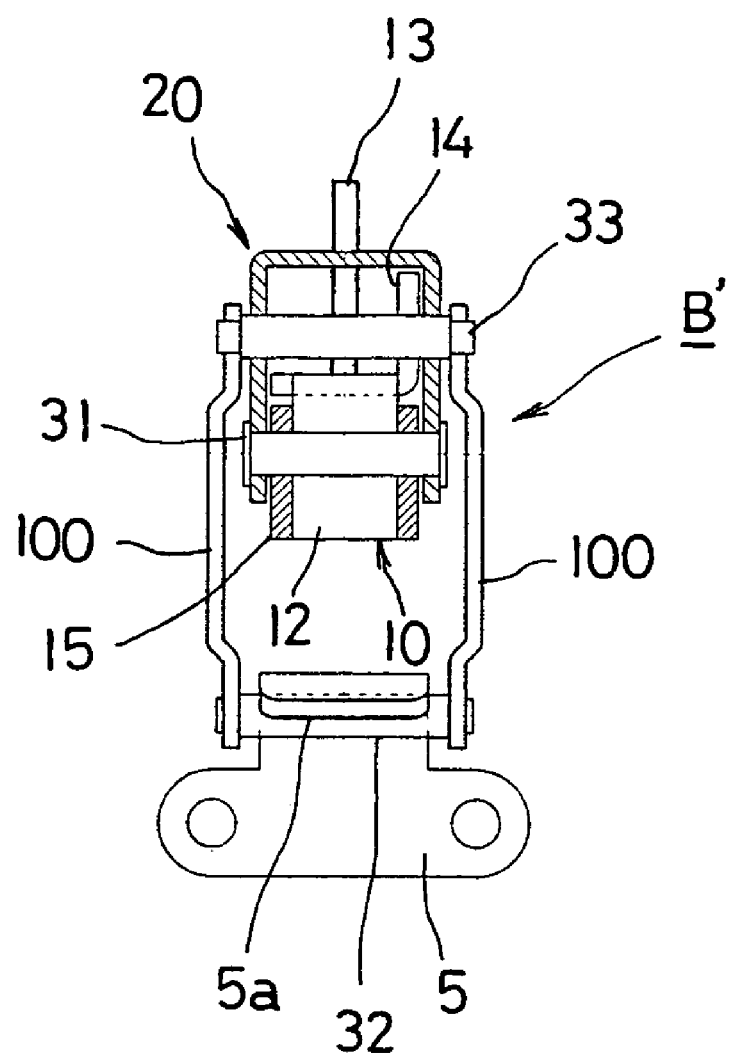
FIG. 16 is a view, like FIG. 6, showing another embodiment of the present invention.

FIG. 16 shows a fastening device B' which can be obtained by partly modifying the above-mentioned fastening device B. In this fastening device B', since only an arm 100 is different and all the remaining component parts are same as in the fastening device B, description thereof is omitted. A pair of arms 100 are formed by partly bending a metal plate. The opposite end parts of the pair of arms 100 are connected to a second shaft 32 and a third shaft 33. When an operating lever 20 is located at the dead point or its nearby area, the bent parts of the pair of arms 100 are resiliently deformed or a seal member 3 is resiliently deformed.

It should be noted that the present invention is not limited to the above embodiments but that many changes and modifications can properly be made in accordance with necessity. For example, the structure of the regular lock may be eliminated.

INDUSTRIAL APPLICABILITY

A fastening device according to the present invention can be applied to a hinge part and/or a hook part which is located on the other side of the hinge part, of a cover for opening/closing a casing.

The invention claimed is:

1. A fastening device comprising:
a support member secured to one body to be fastened;
a base member secured to the other body to be fastened;
an operating lever having a U-shaped configuration in section and a basal end part of which is turnably connected to said base member through a first shaft;
an arm one end part of which is turnably connected to said support member through a second shaft and the other end part of which is turnably connected to said basal end part of said operating lever through a third shaft; and
a lock mechanism;
said operating lever being turned beyond a dead point where said third shaft is aligned with said first and second shafts in accordance with turning motion of said operating lever until said operating lever reaches an overlap position where said operating lever is overlapped with said base member, said operating lever being locked at said overlap position by said lock mechanism,
wherein said lock mechanism includes a lock claw permanently mounted on said base member, a lock pin permanently mounted on said operating lever and laid between opposite side walls of said operating lever and movable between an engagement position with respect to said lock claw and an engagement released position where said lock pin is disengaged from said lock claw, and a pin biasing member permanently received in said operating lever for biasing said lock pin toward said lock claw so that said lock pin is kept engaged with said lock claw.

2. A fastening device according to claim 1, wherein said arm includes a shaft biasing member for biasing said second and third shafts toward each other, and said operating lever is turn-biased by said shaft biasing member such that said operating lever is moved away from said dead point.

3. A fastening device according to claim 1, wherein a shaft biasing member is disposed between said first shaft and said second shaft and adapted to bias said first and second shafts away from each other, and said operating lever is turn-biased by said shaft biasing member such that said operating lever is moved away from said dead point.

4. A fastening device according to claim 1, wherein one end part of said lock pin is passed through a support hole of one side wall of said operating lever with play, thereby said lock pin is turnably supported by said support hole, the other end part of said lock pin is passed through a long hole formed in the other side wall of said operating lever and projected outside said operating lever so as to serve as a handle part, said lock claw is arranged proximate to the other side wall of said operating lever within said operating lever, and said handle part of said lock pin is movable between an engagement position with respect to said lock claw and an engagement released position away from said lock claw, along said long hole.

5. A fastening device according to claim 1, wherein said lock claw is projected to the opposite side of said third shaft, said pin biasing member is composed of a tension coiled spring, one end of said tension coiled spring is hooked on said lock pin and the other end is hooked on a hooking part which is disposed at said operating lever, said hooking part is located on a basal end side of said operating lever from said lock pin, and said lock pin is biased toward said third shaft by said tension coiled spring.

6. A fastening device according to claim 5, wherein third shaft is provided as said hooking part.

7. A fastening device according to claim 2, wherein one end part of said lock pin is passed through a support hole of one side wall of said operating lever with play, thereby said lock pin is turnably supported by said support hole the other end part of said lock pin is passed through a long hole formed in the other side wall of said operating lever and projected outside said operating lever so as to serve as a handle part, said lock claw is arranged proximate to the other side wall of said operating lever within said operating lever, and said handle part of said lock pin is movable between an engagement position with respect to said lock claw and an engagement released position away from said lock claw, along said long hole.

8. A fastening device according to claim 3, wherein one end part of said lock pin is passed through a support hole of one side wall of said operating lever with play, thereby said lock pin is turnably supported by said support hole the other end part of said lock pin is passed through a long hole formed in the other side wall of said operating lever and projected outside said operating lever so as to serve as a handle part, said lock claw is arranged proximate to the other side wall of said operating lever within said operating lever, and said handle part of said lock pin is movable between an engagement position with respect to said lock claw and an engagement released position away from said lock claw, along said long hole.

9. A fastening device according to claim 2, wherein said lock claw is projected to the opposite side of said third shaft, said pin biasing member is composed of a tension coiled spring, one end of said tension coiled spring is hooked on said lock pin and the other end is hooked on a hooking part which is disposed at said operating lever, said hooking part is located on a basal end side of said operating lever from said lock pin, and said lock pin is biased toward said third shaft by said tension coiled spring.

10. A fastening device according to claim 3, wherein said lock claw is projected to the opposite side of said third shaft, said pin biasing member is composed of a tension coiled spring, one end of said tension coiled spring is hooked on said lock pin and the other end is hooked on a hooking part which is disposed at said operating lever, said hooking part is located on a basal end side of said operating lever from said lock pin, and said lock pin is biased toward said third shaft by said tension coiled spring.

11. A fastening device according to claim 4, wherein said lock claw is projected to the opposite side of said third shaft, said pin biasing member is composed of a tension coiled spring, one end of said tension coiled spring is hooked on said lock pin and the other end is hooked on a hooking part which is disposed at said operating lever, said hooking part is located on a basal end side of said operating lever from said lock pin, and said lock pin is biased toward said third shaft by said tension coiled spring.

* * * * *